US012671258B2

(12) United States Patent
Abe et al.

(10) Patent No.: US 12,671,258 B2
(45) Date of Patent: Jun. 30, 2026

(54) PROTECTION CIRCUIT AND CHARGING EQUIPMENT

(71) Applicant: OMRON HEALTHCARE Co., Ltd., Kyoto (JP)

(72) Inventors: Kosuke Abe, Kyoto (JP); Shuhei Munehira, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 0 days.

(21) Appl. No.: 19/075,516

(22) Filed: Mar. 10, 2025

(65) Prior Publication Data

US 2025/0246919 A1 Jul. 31, 2025

Related U.S. Application Data

(63) Continuation of application No. PCT/JP2023/041855, filed on Nov. 21, 2023.

(30) Foreign Application Priority Data

Mar. 15, 2023 (JP) ................................. 2023-040739

(51) Int. Cl.
H02H 5/12 (2006.01)
H02H 9/00 (2006.01)
(Continued)

(52) U.S. Cl.
CPC ................. H02J 7/60 (2026.01); H02H 5/12 (2013.01); H02H 9/008 (2013.01); H02J 7/70 (2026.01)

(58) Field of Classification Search
CPC ...... H02J 7/60; H02J 7/70; H02J 7/00; H02H 5/12; H02H 9/008; H02H 9/00; Y02E 60/10
(Continued)

(56) References Cited

U.S. PATENT DOCUMENTS

2017/0077729 A1* 3/2017 Sato ........................ H02J 7/751

FOREIGN PATENT DOCUMENTS

| JP | 11-178220 A | 7/1999 |
|----|-------------|--------|
| JP | 2002-335633 A | 11/2002 |
| JP | 2012-143020 A | 7/2012 |

OTHER PUBLICATIONS

International Search Report and Written Opinion; Feb. 6, 2024; PCT/JP2023/041855.

* cited by examiner

*Primary Examiner* — Xuan Ly

(74) *Attorney, Agent, or Firm* — Colson Law Group, PLLC

(57) ABSTRACT

A protection circuit includes a P-type MOSFET, a first electrical path connecting a contact positive electrode terminal and a drain terminal of the P-type MOSFET, a second electrical path connecting the positive electrode terminal and a source terminal of the P-type MOSFET, a first N-type MOSFET, a grounded third electrical path connecting a second contact negative electrode terminal and the drain terminal, a fourth electrical path connecting the ground terminal and the source terminal, a fifth electrical path connecting the first contact negative electrode terminal and the fourth electrical path via a resistor, a sixth electrical path connecting a gate terminal of the P-type MOSFET and the fifth electrical path between the first contact negative electrode terminal and the resistor, and a seventh electrical path connecting the gate terminal of and the fifth electrical path between the sixth electrical path and the resistor.

6 Claims, 9 Drawing Sheets

(51) Int. Cl.
  *H02J 7/00*          (2026.01)
  *H02J 7/60*          (2026.01)
  *H02J 7/70*          (2026.01)
(58) Field of Classification Search
  USPC ........................................................ 307/326
  See application file for complete search history.

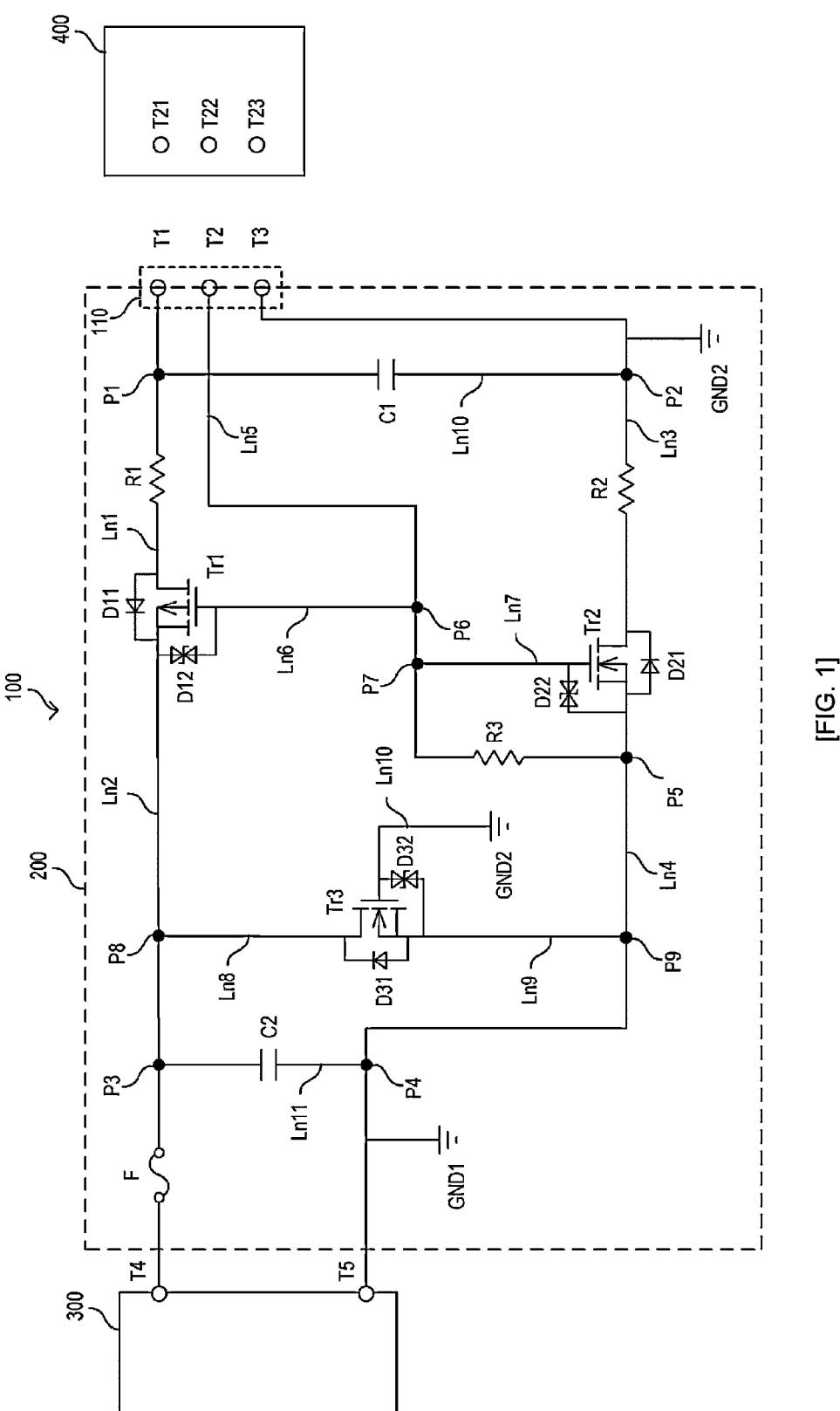
[FIG. 1]

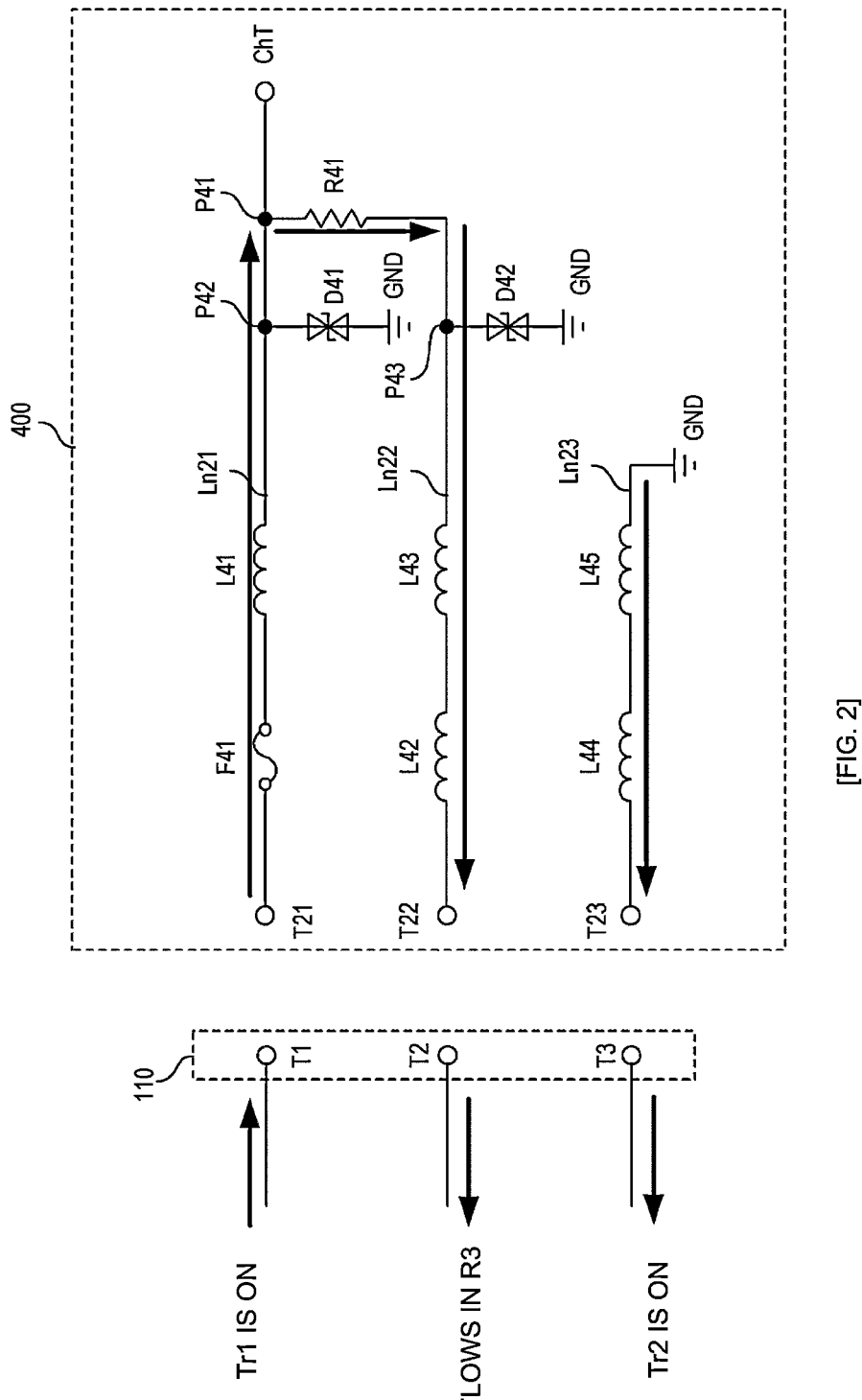
[FIG. 2]

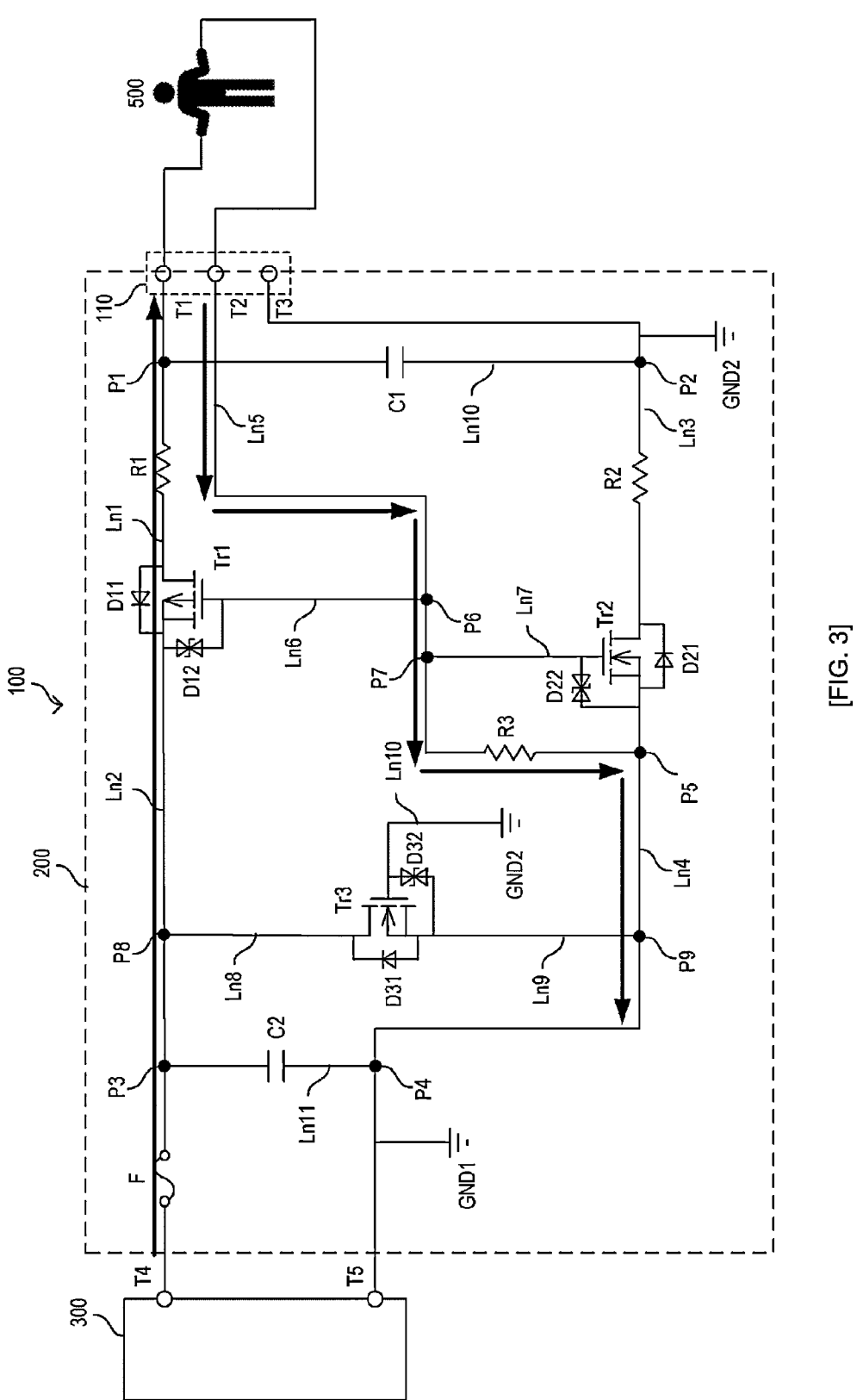
[FIG. 3]

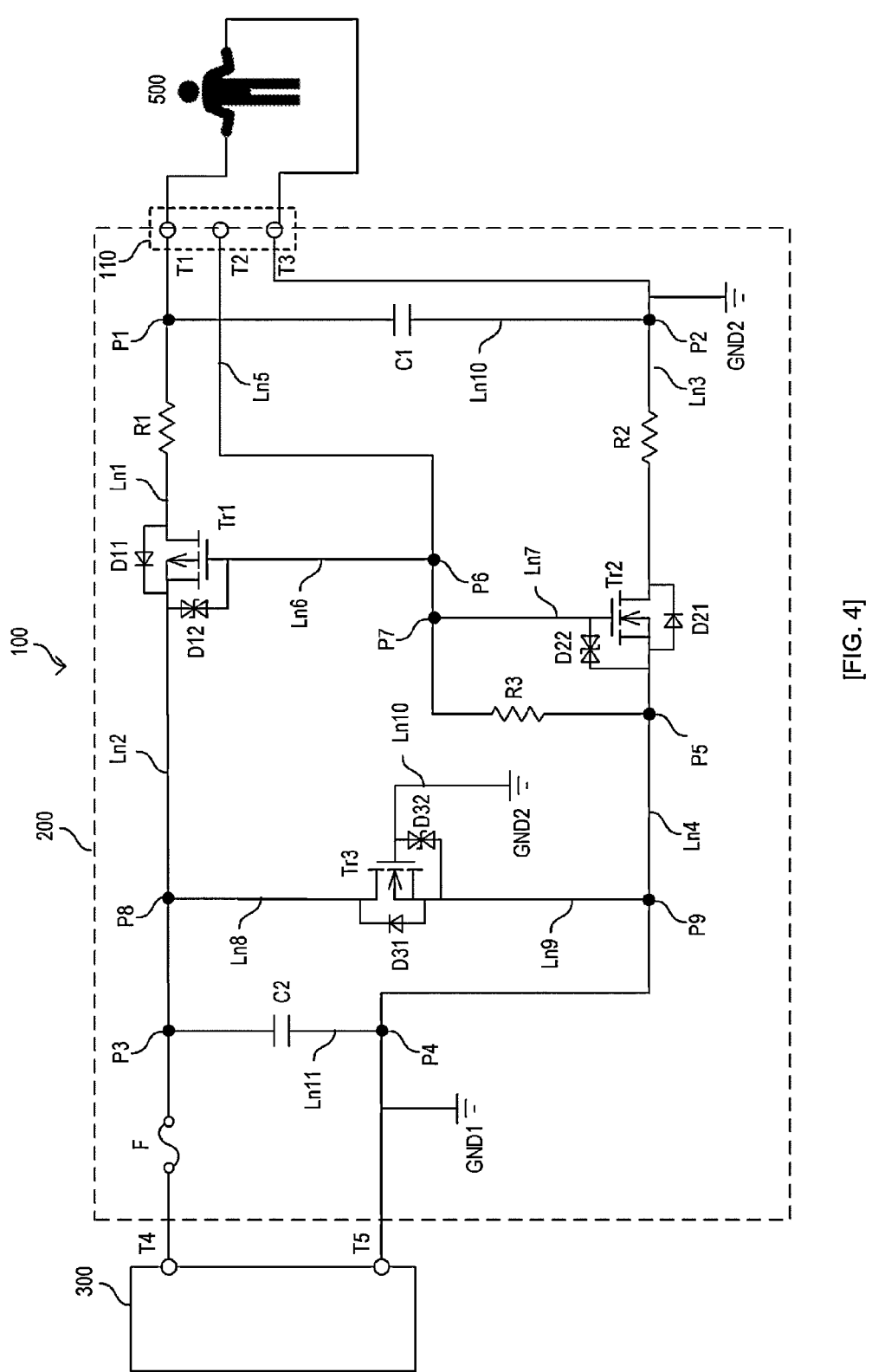
[FIG. 4]

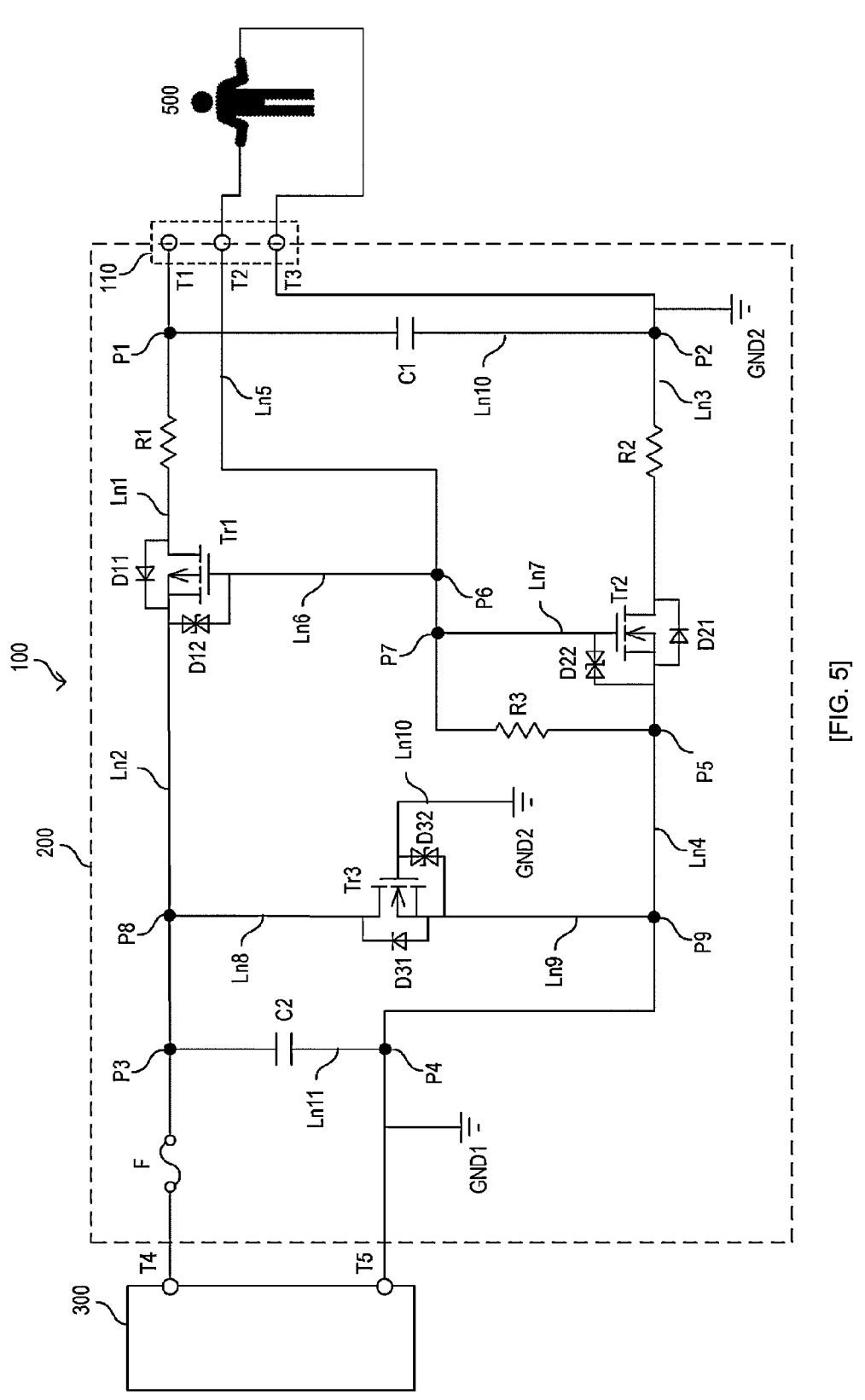
[FIG. 5]

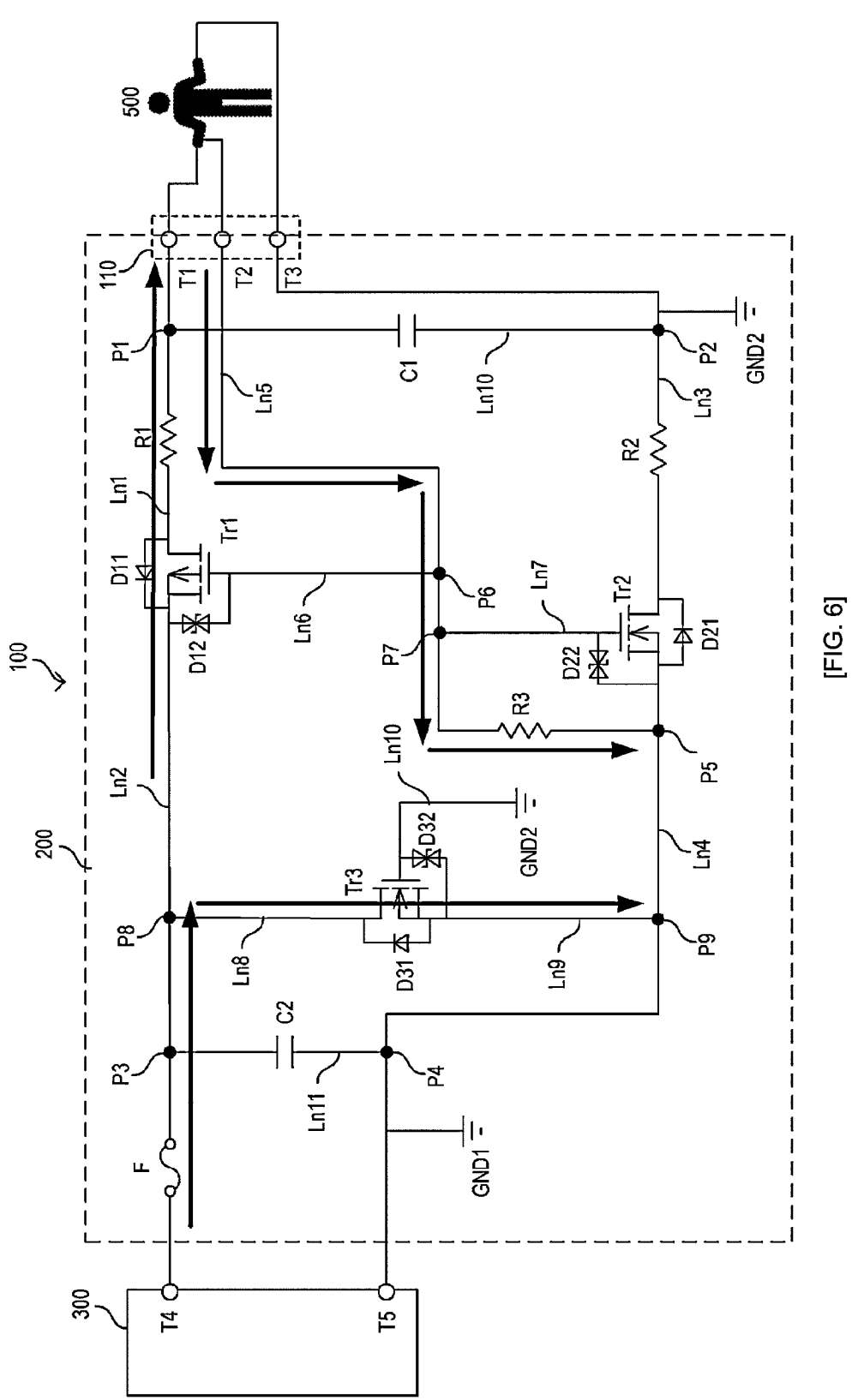
[FIG. 6]

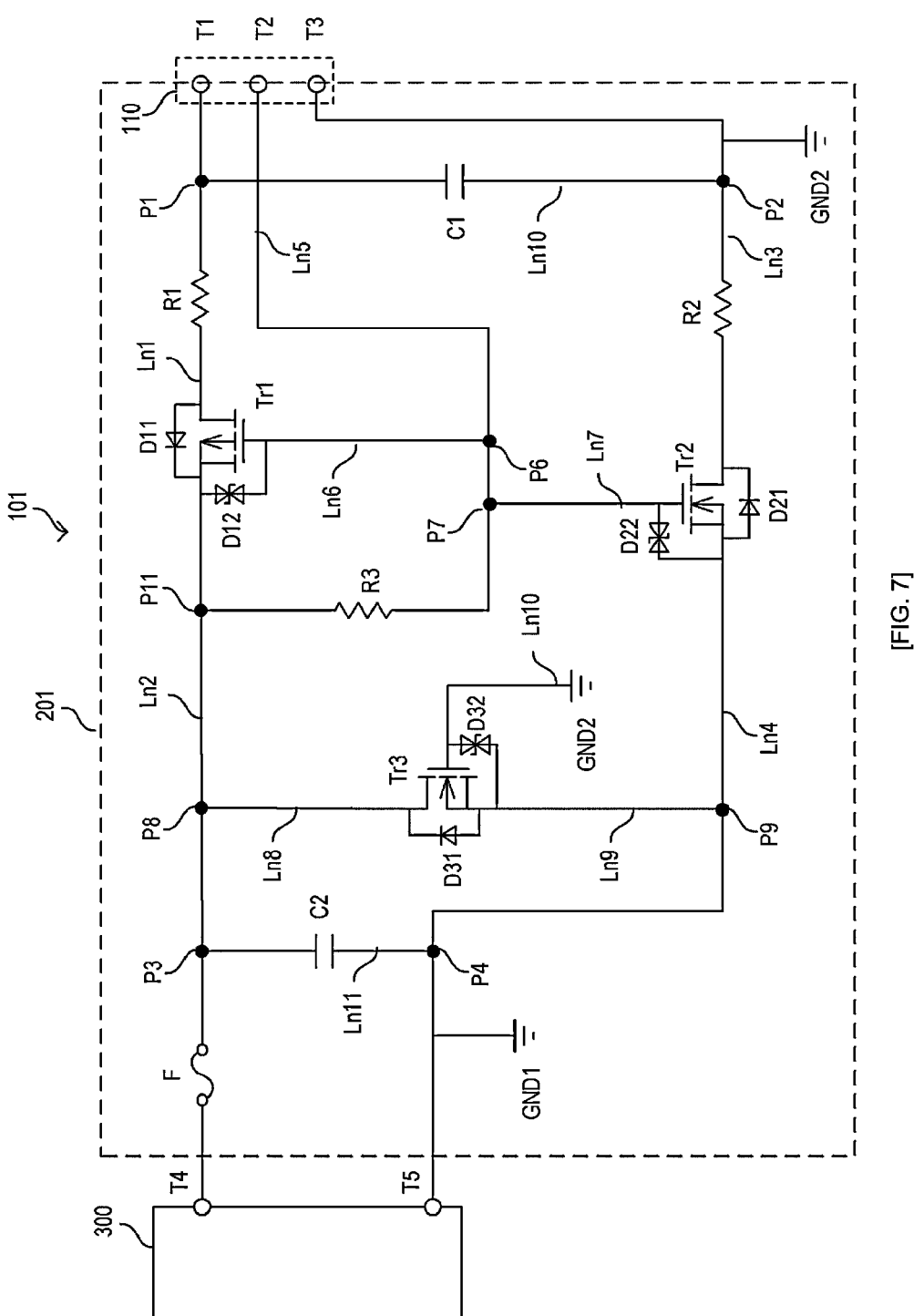
[FIG. 7]

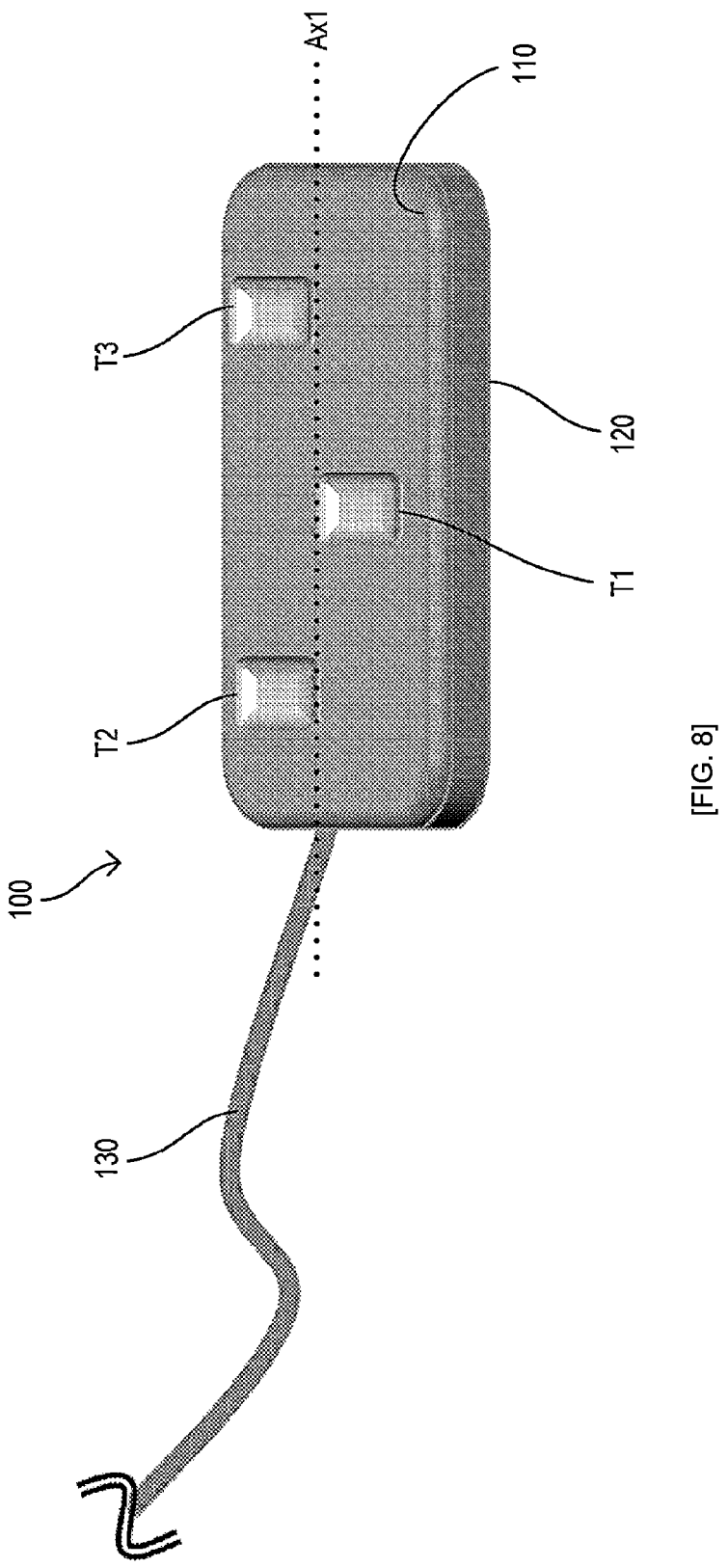
[FIG. 8]

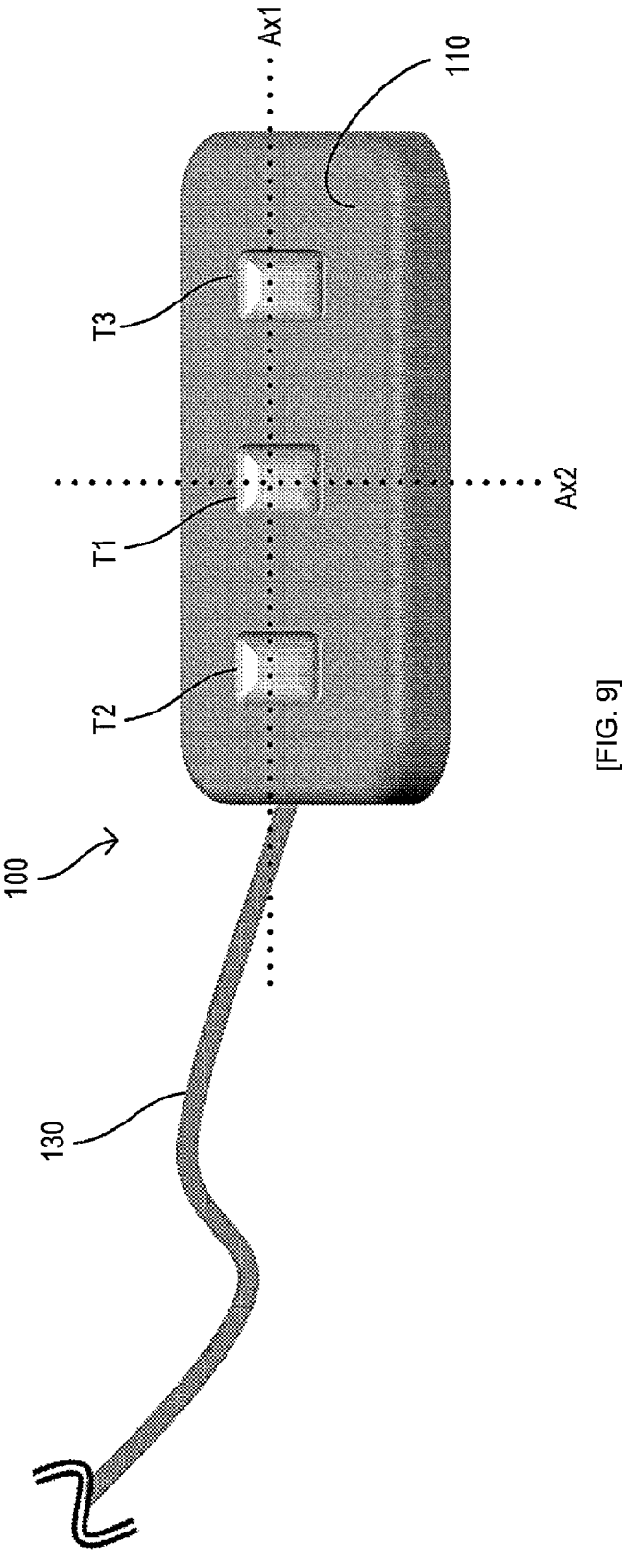
[FIG. 9]

1

PROTECTION CIRCUIT AND CHARGING EQUIPMENT

CROSS-REFERENCE TO RELATED APPLICATIONS

This application is the U.S. national stage application filed pursuant to 35 U.S.C. 365(c) and 120 as a continuation of International Patent Application No. PCT/JP2023/041855, filed Nov. 21, 2023, which application claims priority to Japanese Patent Application No. 2023-040739, filed Mar. 15, 2023, which applications are incorporated herein by reference in their entireties.

TECHNICAL FIELD

The present invention relates to a protection circuit and a charging device including the same.

BACKGROUND

Conventionally, when an electronic device incorporating a secondary battery is charged, the charging is started after the state of the secondary battery is confirmed using three terminals.

In a charger for charging such a secondary battery, safety is eventually secured against a leakage current from an exposed terminal portion to a human body (see Patent Document 1).

CITATION LIST

Patent Literature

Patent Document 1: JP 11-178220 A

SUMMARY OF INVENTION

Technical Problem

However, in such a configuration, since a component or a circuit for receiving information such as a voltage value or a temperature of the secondary battery is required on the charger side, the configuration is complicated.

In view of the above-described conventional technique, an object of the present invention is to provide a technique capable of ensuring safety against a leakage current to a human body with a simple configuration.

Solution to Problem

In order to solve the above-mentioned problems, the present invention is characterized by a protection circuit configured to connect:

a contact positive electrode terminal, a first contact negative electrode terminal, and a second contact negative electrode terminal that are exposed to an outside in a connector portion connected to a device including a secondary battery; and a positive electrode terminal and a ground terminal provided in a power output unit configured to output power supplied to the secondary battery via the contact positive electrode terminal, the first contact negative electrode terminal, and the second contact negative electrode terminal, wherein the protection circuit includes:

a P-type metal-oxide-semiconductor field-effect transistor (MOSFET) connected between the contact positive electrode terminal and the positive electrode terminal;

a first electrical path configured to connect the contact positive electrode terminal and a drain terminal of the P-type MOSFET;

a second electrical path configured to connect the positive electrode terminal and a source terminal of the P-type MOSFET;

a first N-type MOSFET connected between the second contact negative electrode terminal and the ground terminal;

a third electrical path configured to connect the second contact negative electrode terminal and a drain terminal of the first N-type MOSFET, the third electrical path being grounded;

a fourth electrical path configured to connect the ground terminal and a source terminal of the first N-type MOSFET;

a fifth electrical path configured to connect the first contact negative electrode terminal and the fourth electrical path or the second electrical path via a resistor;

a sixth electrical path configured to connect a gate terminal of the P-type MOSFET and the fifth electrical path between the first contact negative electrode terminal and the resistor; and a seventh electrical path configured to connect a gate terminal of the first N-type MOSFET and the fifth electrical path between the sixth electrical path and the resistor.

According to this configuration, even when a person touches at least any two of the contact positive electrode terminal, the first contact negative electrode terminal, and the second contact negative electrode terminal exposed to the outside, and the at least any two touched terminals are electrically connected via a human body, a leakage current does not flow through the human body or only a weak leakage current flows through the human body. Therefore, safety can be ensured with a simple configuration using the P-type MOSFET, the first N-type MOSFET, the second N-type MOSFET, and the passive component, which does not require a complicated configuration such as a control unit.

Further, the present invention may further include:

a second N-type MOSFET connected between the second electrical path and the fourth electrical path;

an eighth electrical path configured to connect a drain terminal of the second N-type MOSFET and the second electrical path;

a ninth electrical path configured to connect a source terminal of the second N-type MOSFET and the fourth electrical path; and a ground path configured to ground a gate terminal of the second N-type MOSFET.

The present invention is characterized by a charging device comprising the protection circuit, wherein in the connector portion, the contact positive electrode terminal, the first contact negative electrode terminal, and the second contact negative electrode terminal are arranged asymmetrically.

According to this configuration, since the contact positive electrode terminal, the first contact negative electrode terminal, and the second contact negative electrode terminal are arranged asymmetrically, connection in a wrong direction with respect to an electronic device having the arrangement of the terminals corresponding thereto can be prevented.

The present invention is characterized by a charging device comprising the protection circuit, wherein in the connector portion, the first contact negative electrode terminal and the second contact negative electrode terminal are arranged symmetrically with respect to the contact positive electrode terminal.

According to this configuration, since the first contact negative electrode terminal and the second contact negative electrode terminal are arranged symmetrically with respect to the contact positive electrode terminal, even when the first contact negative electrode terminal and the second contact negative electrode terminal are connected to the electronic device having the arrangement of the terminals corresponding thereto so as to be reversed with respect to the contact positive electrode terminal, the charger and the electronic device can be appropriately electrically connected to charge the secondary battery.

Advantageous Effects of Invention

According to the present invention, safety against a leakage current to a human body can be ensured with a simple configuration.

BRIEF DESCRIPTION OF DRAWINGS

Various embodiments are disclosed, by way of example only, with reference to the accompanying schematic drawings in which corresponding reference symbols indicate corresponding parts, in which:

FIG. 1 is a circuit diagram of a charger according to Example 1.

FIG. 2 is a circuit diagram illustrating a normal connection state between the charger and an electronic device according to Example 1.

FIG. 3 is a diagram illustrating an electrical connection between the charger according to Example 1 and a person.

FIG. 4 is a diagram illustrating another electrical connection between the charger according to Example 1 and a person.

FIG. 5 is a diagram illustrating another electrical connection between the charger according to Example 1 and a person.

FIG. 6 is a diagram illustrating another electrical connection between the charger according to Example 1 and a person.

FIG. 7 is a circuit diagram of a charger according to a modified example of Example 1.

FIG. 8 is a diagram illustrating an arrangement of terminals in the charger according to the example.

FIG. 9 is a diagram illustrating another arrangement of the terminals in the charger according to the example.

DESCRIPTION OF EMBODIMENTS

Embodiments of the present invention will be specifically described below with reference to the drawings.

Example 1

Hereinafter, an example of the embodiments of the present invention will be described. It should be noted that the dimension, material, shape, relative arrangement, and the like of the components described in the present examples are not intended to limit the scope of this invention to them alone, unless otherwise stated.

Configuration of Charger

FIG. 1 is a circuit diagram including a protection circuit 200 of a charger 100 according to Example 1. The charger 100 is connected to an electronic device 400 including a secondary battery, and supplies power to the secondary battery. The charger 100 includes a connector portion 110 connected to the electronic device 400. In the connector portion 110, terminals T1, T2, and T3 electrically connected to terminals T21, T22, and T23 on the electronic device 400 side, respectively, are provided so as to be exposed to the outside. Here, the charger 100, the connector portion 110, and the protection circuit 200 correspond to the charging device, the connector portion, and the protection circuit of the present invention, respectively. The electronic device 400 corresponds to the device according to the present invention. Further, the terminals T1, T2, and T3 correspond to the contact positive electrode terminal, the first contact negative electrode terminal, and the second contact negative electrode terminal of the present invention, respectively.

The protection circuit 200 is provided between the terminals T1, T2, and T3 and a positive electrode terminal T4 and a ground terminal T5 of an output unit 300. The output unit 300 is electrically connected via the protection circuit 200 and the terminals T1, T2, and T3, and outputs power to the secondary battery of the electronic device 400. The output unit 300 may be a component or a circuit capable of outputting power to the protection circuit 200 via the positive electrode terminal T4, and may be, for example, a power conversion apparatus such as a converter connected to a commercial power system or a connector connected to the power conversion apparatus. Here, the output unit 300 corresponds to the power output unit of the present invention.

The terminal T1 is connected to the drain terminal of a p-channel enhancement-mode metal-oxide-semiconductor field-effect transistor (p-MOSFET) Tr1 by an electrical path Ln1. In the electrical path Ln1, a resistor R1 is connected in series between the terminal T1 and the drain terminal of the p-MOSFET Tr1. The source terminal of the p-MOSFET Tr1 is connected to the positive electrode terminal T4 of the output unit 300 by an electrical path Ln2. In the electrical path Ln2, a fuse F is connected between the positive electrode terminal T4 and the source terminal of the p-MOSFET Tr1. Here, the p-MOSFET Tr1 corresponds to the P-type MOSFET of the present invention, and the electrical path Ln1 and the electrical path Ln2 correspond to the first electrical path and the second electrical path of the present invention, respectively.

A diode D11 having a forward direction from the drain terminal to the source terminal of the p-MOSFET Tr1 is connected in parallel between the source terminal and the drain terminal. A bi-directional transient voltage suppressor (TVS) diode D12 is connected in parallel between the gate terminal and source terminal of the p-MOSFET Tr1.

The terminal T3 is connected to the drain terminal of an n-channel enhancement-mode MOSFET (n-MOSFET) Tr2 by an electrical path Ln3. In the electrical path Ln3, a resistor R2 is connected in series between the terminal T3 and the drain terminal of the n-MOSFET Tr2. The source terminal of the n-MOSFET Tr2 is connected to the ground terminal T5 of the output unit 300 by an electrical path Ln4. Here, the n-MOSFET Tr2 corresponds to the first N-type MOSFET of the present invention. The electrical path Ln3 and the electrical path Ln4 correspond to the third electrical path and the fourth electrical path of the present invention, respectively.

A diode D21 having a forward direction from the source terminal to the drain terminal of the n-MOSFET Tr2 is connected in parallel between the source terminal and the drain terminal. A bi-directional TVS diode D22 is connected in parallel between the gate terminal and source terminal of the n-MOSFET Tr2.

The terminal T2 is connected to the electrical path Ln4 by an electrical path Ln5. One end of the electrical path Ln5 is connected to the terminal T2, and the other end of the electrical path Ln5 is connected to the electrical path Ln4 at a connection point P5 via a resistor R3 connected in series. In addition, one end of an electrical path Ln6 is connected to the gate terminal of the p-MOSFET Tr1, and the other end of the electrical path Ln6 is connected to the electrical path Ln5 at a connection point P6. Further, one end of an electrical path Ln7 is connected to the gate terminal of the n-MOSFET Tr2, and the other end of the electrical path Ln7 is connected to the electrical path Ln5 at a connection point P7. In this case, the connection point P6 and the connection point P7 are arranged between the terminal T2 and the resistor R3. Here, the electrical path Ln5 corresponds to the fifth electrical path of the present invention, and the resistor R3 corresponds to the resistor of the present invention. The electrical path Ln6 and the electrical path Ln7 correspond to the sixth electrical path and the seventh electrical path of the present invention, respectively.

An n-MOSFET Tr3 is connected between the electrical path Ln2 and the electrical path Ln4. One end of an electrical path Ln8 is connected to the drain terminal of the n-MOS-FET Tr3, and the other end of the electrical path Ln8 is connected to the electrical path Ln2 at a connection point P8. The connection point P8 is arranged on the electrical path Ln2 between the source terminal of the p-MOSFET Tr1 and the fuse F. One end of an electrical path Ln9 is connected to the source terminal of the n-MOSFET Tr3, and the other end of the electrical path Ln9 is connected to the electrical path Ln4 at a connection point P9. The gate terminal of the n-MOSFET Tr3 is grounded by an electrical path Ln10. Here, the n-MOSFET Tr3 corresponds to the second N-type MOSFET of the present invention. Further, the electrical path Ln8, the electrical path Ln9, and the electrical path Ln10 correspond to the eighth electrical path, the ninth electrical path, and the ground path of the present invention, respectively.

A diode D31 having a forward direction from the source terminal to the drain terminal of the n-MOSFET Tr3 is connected in parallel between the source terminal and the drain terminal. A bi-directional TVS diode D32 is connected in parallel between the gate terminal and source terminal of the n-MOSFET Tr3.

The electrical path Ln1 and the electrical path Ln3 are connected by the electrical path Ln10 to which a capacitor C1 is connected in series. One end of the electrical path Ln10 is connected to the electrical path Ln1 at a connection point P1 arranged between the terminal T1 and the resistor R1. The other end of the electrical path Ln10 is connected to the electrical path Ln3 at a connection point P2 arranged between the terminal T3 and the resistor R2. The electrical path Ln3 is grounded between the connection point P2 and the terminal T3.

The electrical path Ln2 and the electrical path Ln4 are connected by an electrical path Ln11 to which a capacitor C2 is connected in series. One end of the electrical path Ln11 is connected to the electrical path Ln2 at a connection point P3 arranged between the connection point P8 and the fuse F. Further, the other end of the electrical path Ln11 is connected to the electrical path Ln4 at a connection point P4 arranged between the connection point P9 and the ground terminal T5.

FIG. 2 is a circuit diagram illustrating a part of a configuration including the terminals T21, T22, and T23 of the electronic device 400. The terminal T21 is connected to a charging terminals ChT by an electrical path Ln21. A fuse F41 and an inductor L41 are connected in series to the electrical path Ln21 in this order from the terminal T21 side. The terminal T22 is connected to the electrical path Ln21 via an electrical path Ln22. An inductor L42, an inductor L43, and a resistor R41 are connected in series to the electrical path Ln22 in this order from the terminal T22 side. The electrical path Ln22 is grounded via a bi-directional TVS diode D42 at a connection point P43 between the inductor L43 and the resistor R41. In addition, at a connection point P42 between the inductor L41 and a connection point P41 between the electrical path Ln22 and the electrical path Ln21, the electrical path Ln21 is grounded via a bi-directional TVS diode D41. The terminal T23 is grounded by an electrical path Ln23. An inductor L44 and an inductor L45 are connected in series to the electrical path Ln23 in this order from the terminal T23 side.

First, FIG. 3 illustrates a state in which a person 500 touches the terminal T1 and the terminal T2 of the charger 100. At this time, since the potential of the electrical path Ln2 is 5 V and a gate voltage VGS of the p-MOSFET Tr1 becomes −5 V, the p-MOSFET Tr1 is turned on. As a result, a current flows through the resistor R3 of the charger 100 via the person 500. However, for example, by setting the resistance value of the resistor R3 to 100 kΩ, the current flowing through the person 500 becomes 5 V/100 kΩ=50 μA, and the leakage current can be suppressed to about less than 100 μA, which is the standard in medical devices, so that a leakage current dangerous to the human body does not flow.

FIG. 4 illustrates a state in which the person 500 touches the terminal T1 and the terminal T3 of the charger 100. At this time, since a voltage drop that causes the gate voltage VGS to exceed the threshold does not occur in the p-MOS-FET Tr1, the p-MOSFET Tr1 is in the off state, and no current flows through the person 500.

FIG. 5 illustrates a state in which the person 500 touches the terminal T2 and the terminal T3 of the charger 100. At this time, no voltage is applied to and no current flows through the person 500.

FIG. 6 illustrates a state in which the person 500 touches the terminal T1, the terminal T2, and the terminal T3 of the charger 100. For example, it is assumed that such a state occurs when these three terminals come into contact with a place where the surface of the person 500 is wet with liquid, or when the three terminals of the charger 100 are accidentally immersed in water in a washroom or the like. At this time, since the gate voltage VGS of the p-MOSFET Tr1 becomes-5 V, the p-MOSFET Tr1 is turned on. Then, a current flows through the resistor R3. Due to the voltage drop occurring in the resistor R3, the gate voltage VGS of the n-MOSFET Tr3 exceeds the threshold, and the n-MOS-FET Tr3 is turned on. Accordingly, when a current flows through the electrical path Ln2 via the n-MOSFET Tr3, the fuse F is opened, and the operation of the charger 100 is stopped. Thus, no current will continue to flow through the person 500. However, to achieve such an operation, it is necessary to select for the n-MOSFET Tr3 a component having a lower threshold and a faster switching speed than the n-MOSFET Tr2.

As described above, according to the present Example 1, safety against a leakage current to a human body can be ensured by the protection circuit 200 having a simple configuration including passive components and transistors.

Modified Example

FIG. 7 illustrates a circuit diagram including a protection circuit 201 of a charger 101 according to a modified example. The same components as those of the protection circuit 200 according to Example 1 are denoted by the same reference numerals, and a detailed description thereof will be omitted. In the protection circuit 201, one end of the electrical path Ln5, the other end of which is connected to the terminal T2, is connected, not to the electrical path Ln4, but to the electrical path Ln2 that connects the source terminal of the p-MOSFET Tr1 and the positive electrode terminal T4, between the source terminal of the p-MOSFET Tr1 and the connection point P8. Here, the electrical path Ln5 corresponds to the fifth electrical path of the present invention. Also in the protection circuit 201 having such a configuration, since the p-MOSFET Tr1, the n-MOSFET Tr2, and the n-MOSFET Tr3 are turned on and off by the same mechanism as that of the protection circuit 200 according to Example 1, the same effect can be obtained. Therefore, according to the present modified example, safety against a leakage current to a human body can be ensured by the protection circuit 201 having a simple configuration including passive components and transistors.

FIG. 8 illustrates an arrangement configuration example of the terminals T1, T2, and T3 in the connector portion 110 of the charger 100. The charger 100 includes a flat and substantially rectangular parallelepiped housing 120 and a cable 130. One end of the cable 130 is connected to the housing 120, and the other end is connected to a power supply such as an AC adapter. In the planar connector portion 110 formed on one surface of the housing 120, the terminal T2, the terminal T1, and the terminal T3 are arranged in this order from the cable 130 side along an axis Ax1 in the longitudinal direction of the connector portion 110. The terminal T1 and the terminals T2 and T3 are arranged asymmetrically with respect to the axis Ax1 in the longitudinal direction of the connector portion 110. That is, the terminal T1 is arranged on one side with respect to the axis Ax1, and the terminals T2 and T3 are arranged on the other side with respect to the axis Ax1. Similarly, the terminals T21, T22, and T23 of the electronic device 400 are arranged asymmetrically with respect to the axes in the arrangement direction in order to come into contact with the terminals T1, T2, and T3 of the charger 100. Therefore, even if an attempt is made to connect the electronic device 400 and the connector portion 110 of the charger 100 in the opposite direction with respect to the arrangement direction of the respective terminals, the electronic device 400 and the charger 100 cannot be appropriately connected, so that the electronic device 400 and the charger 100 can be prevented from being connected in the wrong direction.

Configuration of Charger

Hereinafter, an arrangement configuration of the terminals T1, T2, and T3 in the charger 100 including the protection circuit 200 described above will be described. Since the following configuration can also be adopted for the charger 101 including the protection circuit 201, individual description thereof will be omitted.

FIG. 9 illustrates another arrangement configuration example of the terminals T1, T2, and T3 in the connector portion 110 of the charger 100. As in FIG. 8, the charger 100 includes the flat and substantially rectangular parallelepiped housing 120 and the cable 130. One end of the cable 130 is connected to the housing 120, and the other end is connected to a power supply such as an AC adapter. In the planar connector portion 110 formed on one surface of the housing 120, the terminal T2, the terminal T1, and the terminal T3 are arranged in this order from the cable 130 side along the axis Ax1 in the longitudinal direction of the connector portion 110. The terminal T1 and the terminals T2 and T3 are arranged symmetrically with respect to the axis Ax1 in the longitudinal direction of the connector portion 110. In addition, at this time, by setting the terminal T1 as a positive electrode and the terminal T2 and the terminal T3 as negative electrodes, the terminal T1 as a positive electrode and the terminal T2 and the terminal T3 as negative electrodes are arranged symmetrically with respect to an axis Ax2 in the direction orthogonal to the longitudinal direction. For this reason, the terminals T21, T22, and T23 of the electronic device 400 also come into contact with the terminals T1, T2, and T3 on the charger 100 side, the three terminals T21, T22, and T23 are arranged symmetrically with respect to the axis Ax1 in the arrangement direction similarly, and with respect to the terminal T21, the terminal T22 and the terminal T23 are arranged symmetrically with respect to the axis Ax2 in the direction orthogonal to the arrangement direction. With such an arrangement, even when the electronic device 400 and the connector portion 110 of the charger 100 are connected to each other in a direction opposite to the arrangement direction of the respective terminals, the electronic device 400 and the charger 100 can be appropriately connected to each other. Therefore, the electronic device 400 and the charger 100 can be connected without concern for the directions of the electronic device 400 and the charger 100, and there is no possibility that the connection is made in a wrong direction and the proper connection cannot be made.

REFERENCE NUMERALS LIST

100, 101 Charger
110 Connector portion
200, 201 Protection circuit
300 Output unit
400 Electronic device
T1, T2, T3 Terminal

The invention claimed is:

1. A protection circuit configured to connect:
a contact positive electrode terminal, a first contact negative electrode terminal, and a second contact negative electrode terminal that are exposed to an outside in a connector portion connected to a device including a secondary battery; and
a positive electrode terminal and a ground terminal provided in a power output unit configured to output power supplied to the secondary battery via the contact positive electrode terminal, the first contact negative electrode terminal, and the second contact negative electrode terminal, wherein
the protection circuit includes:
a P-type metal-oxide-semiconductor field-effect transistor (MOSFET) connected between the contact positive electrode terminal and the positive electrode terminal;
a first electrical path configured to connect the contact positive electrode terminal and a drain terminal of the P-type MOSFET;
a second electrical path configured to connect the positive electrode terminal and a source terminal of the P-type MOSFET;

a first N-type MOSFET connected between the second contact negative electrode terminal and the ground terminal;

a third electrical path configured to connect the second contact negative electrode terminal and a drain terminal of the first N-type MOSFET, the third electrical path being grounded;

a fourth electrical path configured to connect the ground terminal and a source terminal of the first N-type MOSFET;

a fifth electrical path configured to connect the first contact negative electrode terminal and the fourth electrical path or the second electrical path via a resistor;

a sixth electrical path configured to connect a gate terminal of the P-type MOSFET and the fifth electrical path between the first contact negative electrode terminal and the resistor; and a seventh electrical path configured to connect a gate terminal of the first N-type MOSFET and the fifth electrical path between the sixth electrical path and the resistor.

2. The protection circuit according to claim 1, further comprising:

a second N-type MOSFET connected between the second electrical path and the fourth electrical path;

an eighth electrical path configured to connect a drain terminal of the second N-type MOSFET and the second electrical path;

a ninth electrical path configured to connect a source terminal of the second N-type MOSFET and the fourth electrical path; and a ground path configured to ground a gate terminal of the second N-type MOSFET.

3. A charging device comprising the protection circuit according to claim 1, wherein in the connector portion, the contact positive electrode terminal, the first contact negative electrode terminal, and the second contact negative electrode terminal are arranged asymmetrically.

4. A charging device comprising the protection circuit according to claim 1, wherein in the connector portion, the first contact negative electrode terminal and the second contact negative electrode terminal are arranged symmetrically with respect to the contact positive electrode terminal.

5. A charging device comprising the protection circuit according to claim 2, wherein in the connector portion, the contact positive electrode terminal, the first contact negative electrode terminal, and the second contact negative electrode terminal are arranged asymmetrically.

6. A charging device comprising the protection circuit according to claim 2, wherein in the connector portion, the first contact negative electrode terminal and the second contact negative electrode terminal are arranged symmetrically with respect to the contact positive electrode terminal.

* * * * *